March 19, 1968  C. W. RUSSELL ET AL  3,374,480
RECEIVER TUNING FOR RADAR AND THE LIKE
Filed Aug. 20, 1958  5 Sheets-Sheet 5

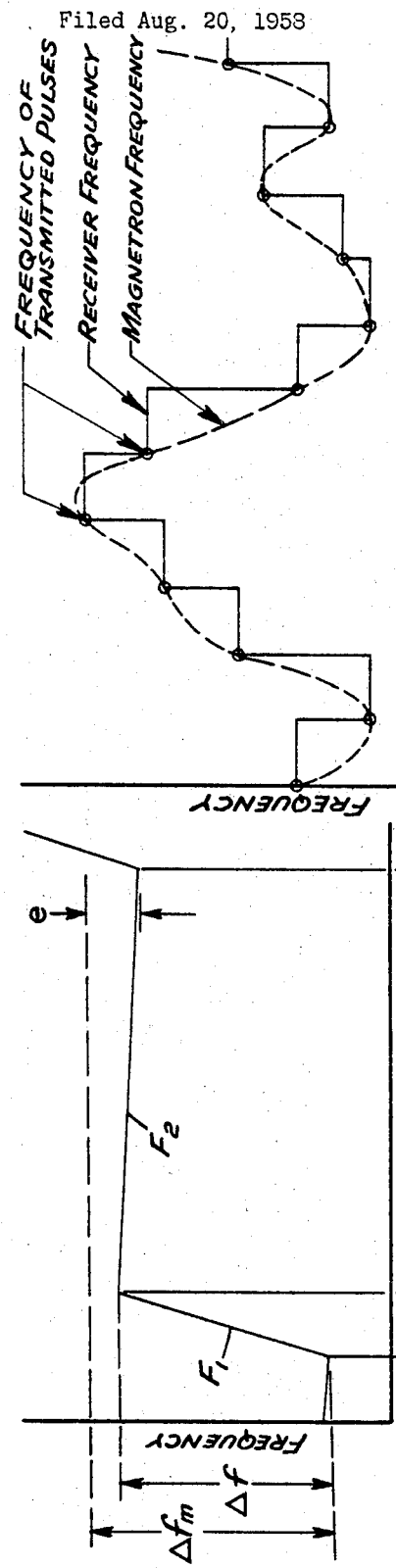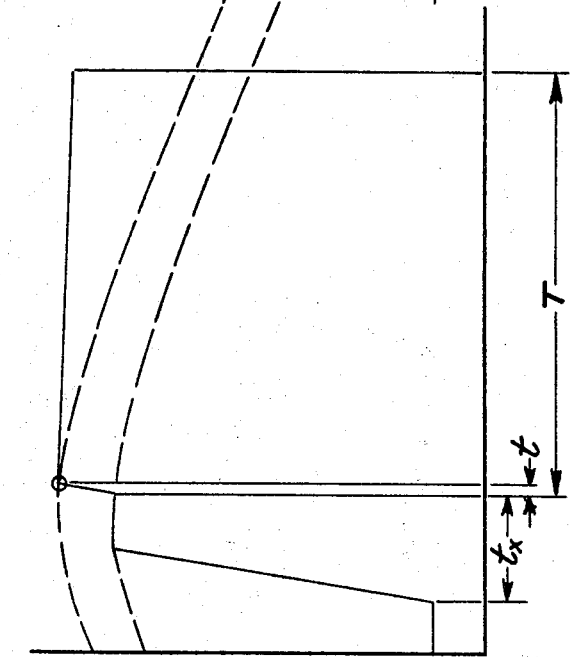
INVENTORS:
CHARLES W. RUSSELL
AND THEODORE LERNER
BY:
Beau, Brooks, Buckley & Beau,
ATTORNEYS.

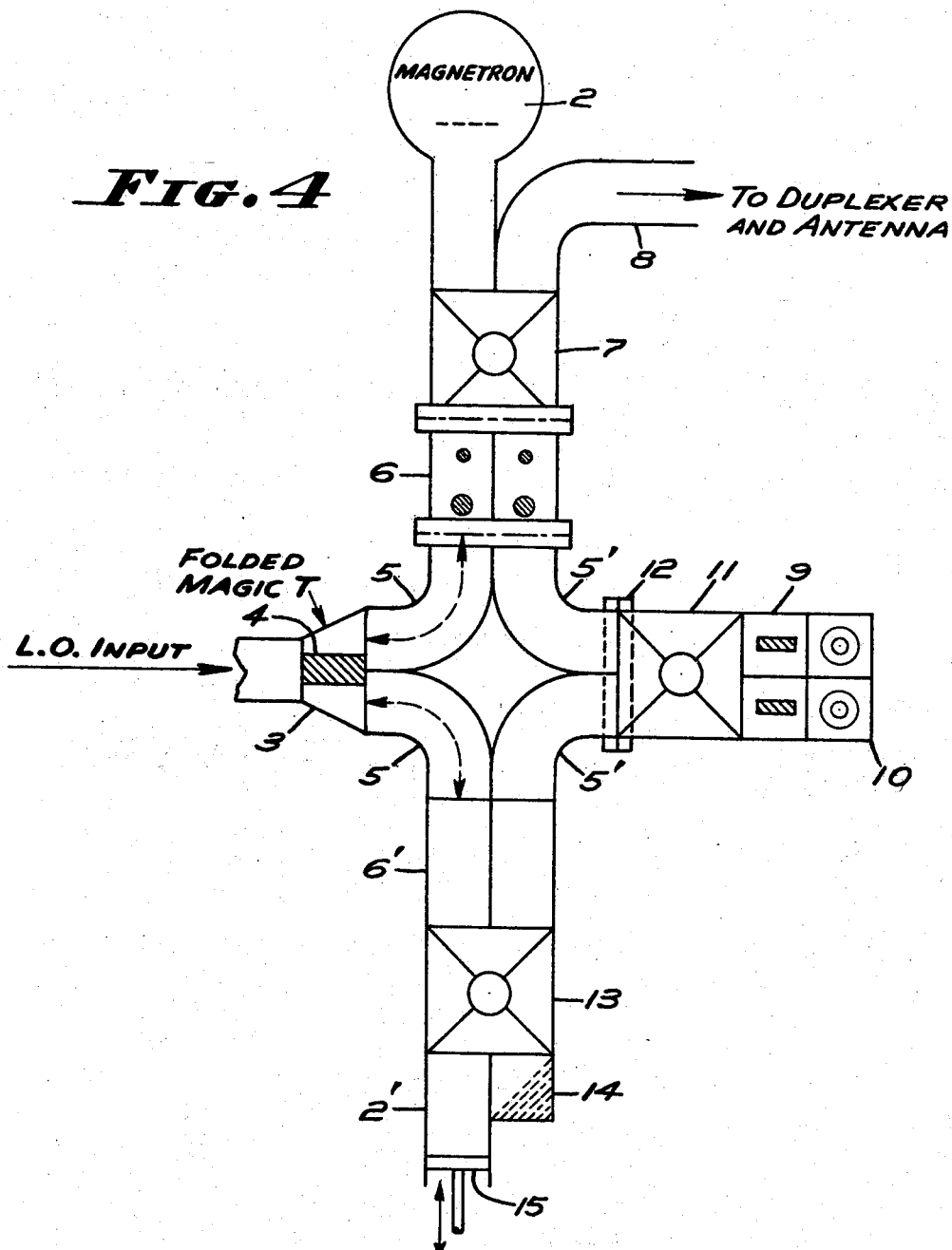

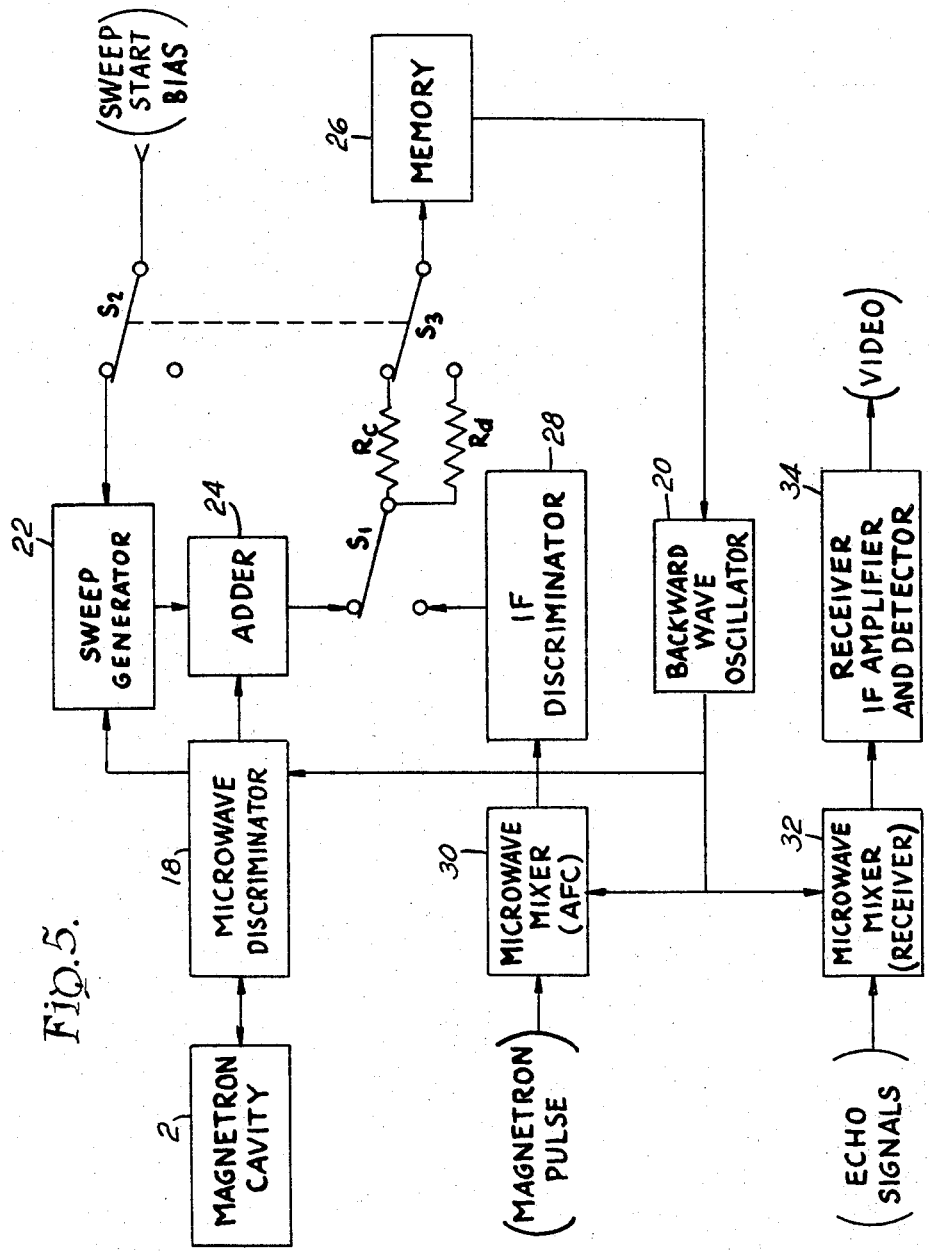

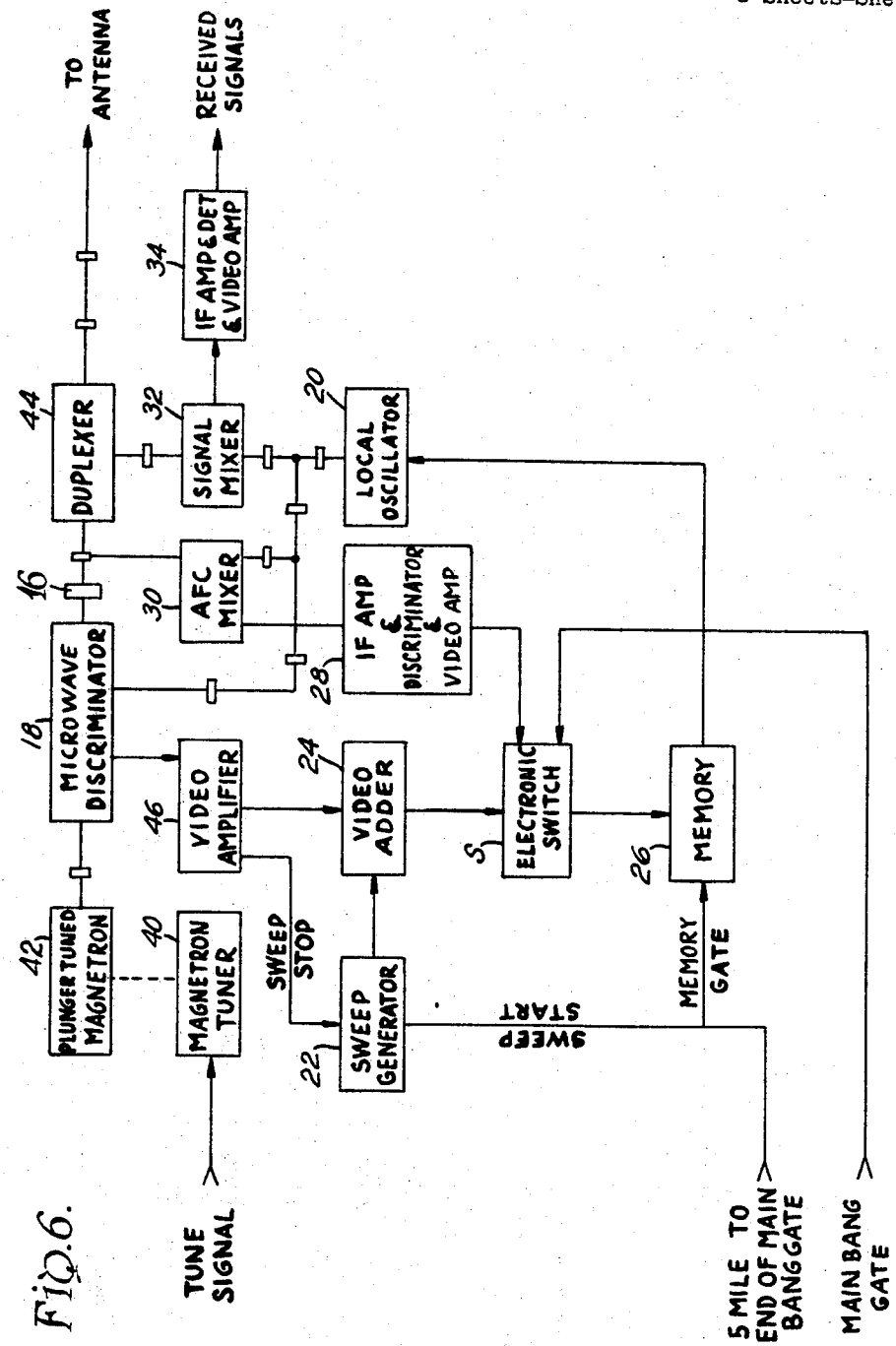

INVENTORS
Charles W. Russell,
& Theodore Lerner,

Beau, Brooks, Buckley & Beau
ATTORNEYS.

United States Patent Office 3,374,480
Patented Mar. 19, 1968

3,374,480
RECEIVER TUNING FOR RADAR
AND THE LIKE
Charles W. Russell, Tonawanda, and Theodore Lerner, Buffalo, N.Y., assignors, by mesne assignments, to Bell Aerospace Corporation, Wheatfield, N.Y., a corporation of Delaware
Filed Aug. 20, 1958, Ser. No. 754,699
5 Claims. (Cl. 343—17.2)

This invention relates primarily to radar and analogous systems, and more specifically to a new and useful method of and means for automatically tuning a radar signal echo received to receive the frequency of the transmitted pulse, particularly where each transmitted pulse varies in frequency by a large amount from adjacent pulses.

While not necessarily limited thereto, the present invention is primarily concerned with anti-jam radar capable of changing frequency in large steps between transmitted pulses, the frequency changes between transmitted pulses being sufficiently large and uncorrelated so that a narrow frequency band jammer, after detecting one pulse, will not be able to jam the echoes resulting from succeeding pulses because such succeeding pulses will be at frequencies which are outside the band of the jammer and which are not predictable from detection of preceding pulses.

The effectiveness of a radar, operating against a jammer, can be expressed as the ratio of information obtained with the jammer in operation to the information that would be obtained in the absence of jamming. If the radar frequency is tuned away from the jammer frequency the effectiveness of the radar will increase because the jamming signal will be attenuated in direct proportion to the off frequency response of the radar receiver, whereas the desired echo signals will be unaffected provided the radar receiver remains tuned to the last radar transmitter pulse to receive the desired echo signals therefrom. Therefore, the effectiveness of a tunable radar against jamming is a direct function of the ratio of radar frequency agility to jammer frequency agility.

Probably the most important limitation on the speed with which the radar can tune arises from the fact that the receiver must always remain tuned to the frequency of the last transmitted pulse if it is to receive an echo signal. By way of illustration, consider a rapid tune radar having a perfect AFC (automatic frequency control), whereby the receiver always is tuned exactly to the transmitter. Assuming that the transmitter is tuning at a rate M mc./s., if the pulse repetition frequency is P p.p.s., the radar will tune M/P mc. between pulses. If the receiver is following the transmitter, the receiver will be detuned by an amount M/P mc. at the end of the pulse period. If the maximum allowable detuning of the receiver for a good presentation is F mc., the maximum tuning rate is given by $M_{max}=FP$.

If this maximum rate is to be exceeded, to produce a comparatively large change in transmitter frequency between successive pulses, some means must be used for tuning the receiver to the transmitter during the transmitted pulse, and then holding the receiver tuned to this frequency during the interpulse period, and the provision of such means is a primary object of this invention.

It is another object of this invention to provide the foregoing in a system which is not significantly larger in size or weight than a conventional radar receiver-transmitter unit, and which is not unduly complicated or expensive compared to conventional radar.

This invention provides a signal generator using a cavity resonator, the presently preferred generator comprising a magnetron, for the transmitter. The magnetron can be tuned very rapidly, by means of a hydraulic drive or a mechanical cam, and the invention provides a novel receiver AFC, characterized as follows. Shortly before the transmitted pulse occurs, the receiver local oscillator is tuned to approximately the correct frequency by means of an AFC circuit which uses the magnetron cavity as the frequency determining element. A final correction to the receiver tuning is made during the transmitted pulse. After the transmitted pulse, the AFC circuit is opened and the receiver remains tuned to the frequency of the transmitted pulse until shortly before the next transmitted pulse when the cycle is repeated.

The foregoing and other objects, advantages and characterizing features of this invention will become clearly apparent from the ensuing detailed analysis and description of a presently preferred embodiment thereof, considered in conjunction with the accompanying drawings forming a part hereof wherein:

FIG. 1 is a graphical representation of the receiver tuning characteristic required when frequency excursions between transmitted pulses are large;

FIG. 2 is a graphical representation illustrating factors involved in receiver tuning during a single pulse period;

FIG. 3 is a graphical representation similar to FIG. 2 but of the receiver tuning characteristic proposed by this invention;

FIG. 4 is a schematic representation of a microwave discriminator suitable for use with this invention;

FIG. 5 is a simplified block diagram of a receiver tuning arrangement of this invention;

FIG. 6 is a block diagram of a receiver-transmitter unit of this invention;

Figure 7:
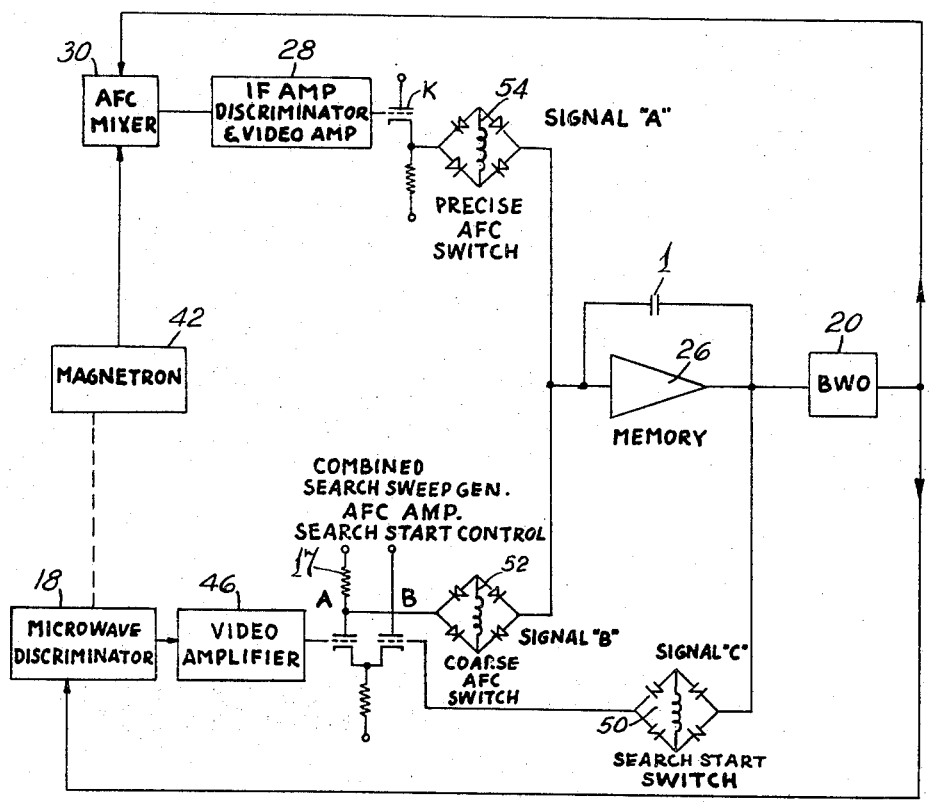
FIG. 7 is a block diagram of an AFC circuit of this invention.

Pulse to pulse tuning is obtained whenever the transmitter frequency is changed by a finite amount between successive pulses. However, the general usage of the term pulse to pulse tuning refers to a comparatively large change of transmitter frequency between successive pulses.

There are two major problems involved in obtaining a usable pulse to pulse tuning radar. The first problem is the attainment of a sufficiently high transmitter tuning rate to provide a reasonably large change in transmitter frequency between successive pulses. The second and more difficult problem, to which this invention is particularly directed, is the attainment of a control to maintain the receiver tuned to the frequency of the last transmitted pulse.

The following analysis of these problems is presented to provide a better understanding of this invention.

MAGNETRON TUNING

Random pulse to pulse frequency variation can be obtained, for example, by tuning the magnetron in accordance with a 120 c.p.s. sine wave with a peak to peak amplitude of frequency change of 500 mc. superimposed on a 10 c.p.s. sine wave with a peak to peak amplitude of 500 mc. The transmitted pulses can occur for example at a pulse repetition frequency of 500 p.p.s., and it can be demonstrated graphically that the frequency spacing between pulses is large and that there is no relationship between the frequencies of the pulses which occur during one excursion and those during the next excursion. The relationship between the frequencies of the pulses can be further complicated by using tuning frequenies which are not harmonically related to the PRF, by using a more complex tuning wave shape, or by varying the frequency of the tuning cycle.

A simple and inexpensive pulse to pulse tunable transmitter can be obtained by actuating a plunger tuned magnetron with a motor driven cam and cam follower assembly. The cam can be cut to provide any tuning characteristic within the velocity and acceleration limits of the magnetron. The speed of the motor can be continuously varied to provide a changing tuning characteristic.

A more versatile pulse to pulse tuning magnetron transmitter can be obtained by operating a plunger tuned magnetron with a hydraulic valve and actuator assembly. The tuning characteristic of this device can be easily varied since it is controlled by the current waveform supplied to the hydraulic valve. A linear integrated hydraulic valve and actuator assembly having internal feedback has been developed by Bell Aircraft Corporation, which assembly provides a plunger displacement which is a linear function of the valve input current and can be readily adapted to operate a plunger tuned magnetron.

In order to verify that the tuning capabilities described above can be obtained, we have discussed the problems with a number of magnetron manufacturers and we have been advised that magnetrons have been developed which can yield a tuning rate of over 150 c.p.s. with an excursion of 500 mc. The life of such a magnetron would be between 20 and 40 million tuning cycles. This represents a life of between 40 and 80 hours of continuous tuning. Tuning rates of up to 800 c.p.s. can be obtained; however, the driving power required tends to become excessive at these very high rates. Thus, tuning rates can be obtained which, for all practical purposes, yield a pulse to pulse frequency change which is so great as to prevent the prediction of the frequency of a transmitted pulse from a knowledge of the history of the frequencies of previous pulses. The frequency separation between transmitter pulses will be large enough so that a limited bandwidth jammer, when transmitting at the frequency of the one radar pulse which it has detected will not interfere with the reception of radar information from the next pulse. The use of a magnetron as the pulse generator is highly desirable, because a magnetron type of oscillator can develop a relatively large power output at extremely high frequencies, with reasonably good efficiency. By way of specific example, it has been found that Magnetron #3211 as listed in the current catalogue of Litton Industries, San Carlos, Calif., functions satisfactorily in this application. The principle of the tuning of this magnetron cavity is disclosed and discussed in Patent 2,799,802, which shows a simple mechanical operator means which can, if desired, be replaced by one of the power actuated types of operator referred to above.

RECEIVER AUTOMATIC FREQUENCY CONTROL

The dashed line of FIGURE 1 represents an arbitrary magnetron transmitted frequency tuning characteristic with successive pulse transmissions occurring at times as represented by the circles. If the echoes of these transmitted pulses are to be received, the receiver must be provided with a tuning characteristic as shown by the solid line. In order to obtain this receiver tuning characteristic, the receiver must be tuned to each new transmitted pulse frequency during the time of the transmitted pulse, and a memory must be provided to maintain the receiver tuned to the frequency of the last pulse during the interpulse period.

FIG. 2 illustrates the receiver tuning characteristic for a single pulse period. Here:

$\Delta f_m$ = error in receiver tuning at the start of the transmitted pulse
$\Delta f$ = receiver tuning during a single magnetron pulse
$t$ = duration of magnetron pulse
$T$ = pulse repetition period
$F_1$ = receiver frequency correction rate
$F_2$ = receiver frequency drift rate
$e$ = receiver tuning error at the end of the interpulse interval The error $e$ is the result of an imperfect memory. In a practical system the memory function is provided by a capacitor 1 (FIG. 7). During the time $t$ of the transmitted pulse the capacitor 1 is charged to a voltage corresponding to the required receiver local oscillator frequency. During the interpulse period $T-t$ the capacitor 1 must substantially hold this voltage. Since there is a finite leakage resistance, the capacitor will discharge by a small amount during the interpulse period and the receiver will drift, and in order to improve the memory the capacitor should be made large. However, since there is a finite charging resistance during the time $t$ of the transmitted pulse, the capacitor cannot be made too large without seriously slowing down the AFC operation. It is evident that for any given pulse width and PRF there will be an optimum value of memory capacity, and with an optimum value of memory capacitor the feasibility of being able to AFC during the short time $t$ of the transmitter pulse and of holding the frequency with a small error during the long interpulse interval $T-t$ depends upon how high a ratio of leakage to charging resistance can practically be obtained in the switch.

Specifically the error $e$ is a function of the ratio of memory charging resistance $R_c$ to memory discharging resistance $R_d$ (FIG. 5), the ratio of memory discharging time $T$ to memory charging time $t$, and the magnitude of the required frequency correction $\Delta f$. The receiver tuning error $e$ is given approximately by:

$$e = \frac{R_c}{R_d} \cdot \frac{T}{t} \cdot \Delta f_m \quad (1)$$

or $$\Delta f_m = \frac{R_d}{R_c} \cdot \frac{t}{T} \cdot e \quad (2)$$

derived as follows:

During the time $t$ the electronic switch (to be described) which connects the AFC circuit to the memory capacitor 1 is closed. The capacitor is then charged through the resistance of the electronic switch in such a direction as to reduce the tuning error toward zero. At the end of the time $t$ the electronic switch is opened and the memory capacitor discharges through the leakage resistance of the electronic switch for a period of time T equal to the interpulse period. The error in tuning $e$ at the end of time T is then $$e = \Delta f_m - F_1 t - F_2 T \quad (3)$$

The receiver frequency correction rate $F_1$ is given by:

$$F_1 = K/R_c C \quad (4)$$

and the receiver frequency drift rate is given by:

$$F_2 = K/R_d C \quad (5)$$

where C is the capacity of the memory capacitor 1. K is a constant which includes the gain of the AFC amplifiers and the frequency to voltage conversion factor of the AFC mixer and the voltage to frequency conversion factor of the BWO (receiver local oscillator). The error $e$ is then:

$$e = \Delta f_m - \frac{K}{R_c C} t - \frac{K}{R_d C} T \quad (6)$$

In a well designed system $$\frac{K}{R_c C} t = \Delta f$$

will be made approximately equal to $\Delta f_m$. Therefore:

$$e = \frac{K}{R_d C} T \quad (7)$$

and $$\frac{K}{R_d C} t = \Delta f_m \quad (8)$$

or $$\frac{K}{C} = \frac{\Delta f_m}{t} R_c \qquad (9)$$

Substituting (9) in (7) we get $$e = \Delta f_m \frac{R_c}{R_d} \frac{T}{t} \qquad (10)$$

which is the same as Equation 1.

In the above derivation the assumption has been made that charging and discharging of the memory capacitor would be linear. In a high gain AFC loop the final stage of the control amplifier will be saturated throughout most of the AFC operation so that charging will be essentially linear for most of the time. Since for small error the leakage time constant must be large compared to the pulse repetition period the assumption that the capacitor discharge is linear is also valid.

In practice the memory switching time will require approximately 50 percent of the transmitter pulse duration $t$ for short pulses, and diode switches with a ratio $R_c/R_d$ of about $10^{-6}$ can be obtained. The maximum receiver frequency correction that can be obtained using precise AFC alone during the transmitter pulse for a transmitter duty cycle of $5 \times 10^{-4}$ is therefore in the order of 250 mc. for a receiver tuning error of 1 mc., or 25 mc. for a receiver tuning error of 0.1 mc. However, with the AFC of this invention, described below, the frequency separation between pulses is no longer a critical limitation on accuracy.

To accomplish full receiver tuning during the time $t$ of the pulse with a large pulse to pulse frequency change is difficult and complex. The amount of receiver tuning required during the time $t$ of the magnetron pulse must be maintained at a small fraction of the total magnetron tuning range, if the receiver tuning error is to be kept small enough to allow the use of the optimum receiver bandwidth as determined by the transmitter pulse length. This is accomplished by the instant invention, as follows. A short time before each transmitted pulse, the receiver frequency is tuned to approximate the magnetron frequency, thereby minimizing the amount of receiver frequency correction required to obtain exact tuning during the time $t$ of the magnetron pulse. FIGURE 3 illustrates this type of receiver tuning characteristic for a single pulse period. Here an approximate receiver correction is initiated a short time, $t_x$, before the magnetron pulse with a final precise correction of receiver frequency made during the magnetron pulse time $t$. It can be readily seen that using this method of receiver tuning, the error in final precise receiver tuning is determined by the accuracy of the initial approximation of the magnetron frequency rather than by the magnitude of the change of magnetron frequency from pulse to pulse.

FIG. 4, schematically illustrates a microwave discriminator, suitable for purposes of this invention, which uses the magnetron cavity 2 as the frequency determining element.

The discriminator of FIG. 4 is symmetrical, when balanced, and comprises a folded magic T 3 having a dummy load 4. The local oscillator signal is fed into the T 3, and divided between waveguides 5. One of waveguides 5 communicates with the magnetron cavity 2 through a dual TR 6 and a short slot hybrid 7. Hybrid 7 also communicates with a waveguide 8 leading to the duplexer and antenna, and then through TR 6 with one of a pair of waveguides 5'. Guides 5' are like guides 5, but communicate with paired attenuators 9 and paired crystals 10 through a short slot hybrid 11. Hybrid 11 is connected to guides 5' by flange means 12 enabling removal of hybrid 11, attenuators 9 and crystals 10 to facilitate balancing of the latter. The guides 5 and 5' leading away from the magnetron communicate with a short slot hybrid 13 through guides 6', compensating for TR 6, and hybrid 13 communicates with a dummy load 14 and with a balancing guide 2' containing a movable short 15.

The operation of this discriminator will be obvious, from the foregoing, to those skilled in the art. The crystals are balanced by adjustment of the attenuators 9, and the system is brought into balance by adjusting the position of short 15. The local oscillator, FIG. 5 comprising a voltage tunable backward wave oscillator 20, is tuned by a sweep signal generator 22 through a range which includes the resonant frequency of cavity 2, and when it is at the cavity frequency the discriminator 18, comprising the assembly of FIG. 4, produces a signal which is thereafter used to maintain the local oscillator tuned to the magnetron cavity frequency, all as will be more fully described hereafter. The dual TR functions in the manner of an insulator, shielding crystals 10 from the transmitted pulse when the magnetron fires.

A laboratory model of this discriminator was constructed, using a type VA 161 backward wave oscillator as the receiver local oscillator and a type 6543 magnetron as the transmitter. Tests made with three type 6543 magnetrons demonstrated that the difference between the magnetron cavity resonant frequency as measured before energization of the magnetron and the frequency of the magnetron pulse, measured during actual operating conditions, varied between 19 mc. and 38.5 mc. over a range of pulse frequencies of from about 8,500 to about 9,000 mc.

Using this microwave discriminator 18 in an AFC loop and selecting a receiver intermediate frequency of 30 mc., it can be seen that the maximum error in initial receiving tuning will be less than 15 mc. (38.5–30 mc. or 30–19 mc.) regardless of magnetron pulse frequency. The final precise receiver tuning error will therefore be less than 0.1 mc. allowing the overall receiver bandpass to be optimized for the pulse length in use.

The use of the magnetron cavity resonant frequency provides an inherently more accurate approximation of the magnetron pulse frequency than would a sensing device using the magnetron plunger position as a measure of magnetron pulse frequency, because use of the resonant frequency of the magnetron cavity directly eliminates errors caused by temperature changes, backlash in the tuner or sensing device, reference voltage or calibration drift, amplifier gain changes and tuner and sensing device nonlinearities. Another important advantage gained from the accuracy of this method is the reduction in the bandwidth required in the intermediate frequency discriminator used to obtain final precise receiver tuning.

A simplified block diagram of a complete receiver is shown in FIGURE 5 in order to illustrate the operation of a complete automatic frequency control incorporating this invention. A short time, corresponding to time $t_x$ of FIGURE 3, before the magnetron pulse, electronic switches $S_2$ and $S_3$ are thrown to their upper position, enabling the memory 26 to receive information and energizing the sweep generator 22 to provide a sweep voltage at the adder 24 output. Electronic switch $S_1$ is in its upper position and the sweep voltage therefore is applied to the memory 26 which in turn causes the backward wave local oscillator 20 to sweep the frequency band which includes the cavity frequency. As the backward wave oscillator frequency approaches the resonant frequency of the magnetron cavity 2, the microwave discriminator 18 provides two outputs. One of the discriminator outputs locks the sweep generator 22 voltage, to stop the search. The other discriminator output consists of a voltage proportional to the difference between the backward wave oscillator frequency and the magnetron cavity frequency and is applied to the adder 24. The adder output, consisting of the combined reference voltage from the locked sweep generator 22 and the frequency sensitive voltage from the microwave discriminator 18 is applied to the memory which corrects the backward wave oscillator frequency until it approaches that of the magnetron cavity 2. Coarse AFC roughly tuning the backward wave oscillator near to the magnetron cavity frequency now has been achieved. At the beginning of the magnetron pulse, switch S₁ is thrown to its lower position, thereby applying the wide band intermediate frequency discriminator 28 output to the memory input. The difference frequency obtained by mixing the magnetron pulse output and the then frequency of the backward wave oscillator output in the AFC microwave mixer 30 is applied to the intermediate frequency discriminator 28 which then provides an output voltage proportional to the amount by which this beat frequency differs from the desired intermediate frequency. The error voltage at the intermediate frequency discriminator 28 output causes the memory 26 to adjust the backward wave oscillator frequency until the desired intermediate frequency (heretofore given by way of example as 30 mc.) is obtained. Fine AFC providing the desired intermediate frequency now has been achieved. At the end of the magnetron pulse, switch S₁ is returned to its upper position, and switches S₂ and S₃ are thrown to their lower position, causing the memory 26 to retain its last information and thereby locking the backward wave oscillator 20 at the desired intermediate frequency. The backward wave oscillator now supplies a local oscillator signal to the receiver microwave mixer 32 as required to convert the incoming echo signals to the desired intermediate frequency of the amplifier and detector 34.

Thus, there is demonstrated the concept of this invention, which is: (1) to provide a coarse AFC prior to the pulse by tuning the receiver local oscillator substantially directly to the pulse generator cavity frequency; and (2) to then provide the final AFC by tuning the local oscillator when mixed with the magnetron pulse frequency to produce the desired intermediate frequency it being noted that the cavity frequency so closely approaches the pulse frequency.

Thus, it is seen that the microwave discriminator acts as a transducer, translating cavity frequency into voltage for tuning the local oscillator, and the local oscillator translates voltage into frequency.

A brief description of the operation of the complete system is as follows, with reference to the block diagram of FIG. 6.

The tune signal applied to the magnetron tuner 40 causes the magnetron 42 to be tuned at a rapid rate so as to obtain a large variable change in transmitter frequency from pulse to pulse, as previously described. The magnetron output is passed through the microwave discriminator 18 with negligible attenuation, and thence through a conventional ferrite load isolator 16 and duplexer 44 to the antenna. A conventional T-R tube is used in the microwave discriminator 18 to block the magnetron output from the discriminator crystals 10 and provide an open path for the local oscillator output during the time between magnetron pulses, as previously described.

The sweep generator 22 is triggered on and the memory 26 is gated to receive information approximately sixty microseconds (5 miles) before the main bang or pulse. The sweep generator 22 output is fed through the video adder 24 and electronic switch S to the memory 26, causing the local oscillator 20 to sweep the total magnetron tuning range. As the local oscillator 20 is swept through the resonant frequency of the magnetron cavity 2, the microwave discriminator 18 provides an output to the video amplifier 46 which then provides a sweep stop trigger to lock the sweep generator voltage at an output proportional to the error between the local oscillator 20 and magnetron cavity 2 frequencies to the video adder 24. The sweep generator and video amplifier outputs are combined in the video adder 24 and fed to the memory through the electronic switch S. This composite signal causes the local oscillator 20 to track the magnetron cavity frequency, thus giving coarse AFC and providing an output which coarsely approximates the receiver intermediate frequency. At the start of the main bang the electronic switch S is tripped to switch the input of the memory 26 from the video adder 24 output to the intermediate frequency discriminator 28 output. A sample of the pulse is applied to the AFC mixer 30, and the output of the AFC mixer is applied to the intermediate frequency discriminator 28 which causes the memory 26 to correct the local oscillator frequency until the required intermediate frequency is obtained, giving fine AFC. At the end of the main bang the memory 26 is gated to retain its last information and the electronic switch S is returned to its original condition. All controls are disconnected from the memory 26, and the local oscillator 20 is held at the required frequency by the memory while its output is applied to the signal mixer 32 which converts the microwave signal frequency to the desired intermediate frequency, to receive echo signals while the magnetron is tuned for the next pulse.

Of course, it is not necessary to use 30 mc. IF. Any IF can be used, by putting a constant offset in the coarse AFC loop.

FIGURE 7 is a combined block diagram and schematic of a suitable AFC system. It is essentially the same as FIGURE 6, except that the search and switching functions are shown in schematic form.

The basic operation of the coarse AFC, as illustrated in FIG. 7, revolves around the combined search sweep generator, AFC amplifier, and search start control (tubes A and B). The bias on the two tubes is adjusted so that normally tube A is cut off and tube B is conducting.

Figure 8:
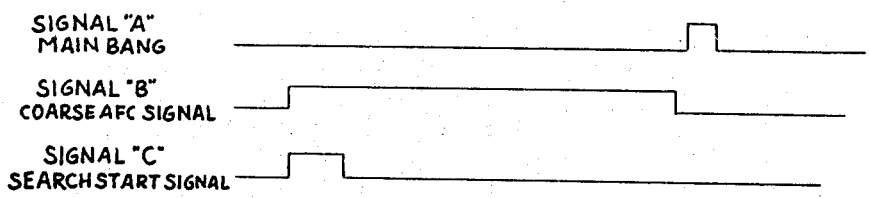
FIG. 8 is a graphical representation of the search, course AFC and main bang or transmitter signals, related in time.

When a search start signal C and a coarse AFC signal B are applied to the appropriate switches (FIG. 8), a negative voltage from the output of the memory 26 is applied to the grid of tube B, driving the cathode negative and causing tube A to conduct. With both tubes now conducting, and both search start switch 50 and coarse AFC switches closed, the output of the memory is connected to the input, and the memory capacitor 1 is rapidly discharged to a value such that the output of the memory 26 is equal to the voltage at the grid of tube A. This approach for discharging the capacitor 1 is considered to be of significance, because it eliminates the problem of drift in the D.C. memory amplifier.

After the search start signal C is removed, tube A is cut off and a voltage is applied to the memory 26 through the plate load resistor 17 of tube A. The output voltage from the memory decreases linearly, thus causing the BWO frequency to search the band. When this frequency is equal to that indicated by the magnetron cavity 2 an output voltage is obtained from the microwave discriminator 18 which overrides the bias on the grid of tube A, causing the tube to conduct and stopping the search. The AFC loop is now closed and the BWO frequency is held to that indicated by the magnetron cavity 2.

Just prior to the main bang, the coarse AFC switch 52 is opened (see FIG. 8), and at the start of the main bang the precise AFC switch 54 is closed, receiving its signal through a cathode follower tube K. The output from the magnetron 42 is now mixed with the output from the BWO 20. The IF discriminator 28, which is tuned to the same frequency as the IF portion of the radar receiver, develops an error voltage which drives the memory 26 through the precise AFC switch 54 in such a direction as to reduce the error to zero. At the end of the magnetron pulse the precise AFC switch 54 is opened. The memory 26 now has all inputs disconnected, and it holds the output voltage to a constant value (within the memory error) which maintains the receiver tuned to the frequency of the magnetron pulse.

Thus, it is seen that the instant invention fully accomplishes its intended purpose, and it will be appreciated that those system components and circuits which are not described in detail in the foregoing are conventional and standard, the availability and use of which has been determined to be feasible for purposes of the invention.

While only a presently preferred form of the invention has been disclosed and described in detail herein, it will be understood that the foregoing exemplary embodiment is subject to modifications and variations by those skilled in the art, all of which are intended to be included within the scope of the appended claims.

Having fully disclosed and completely described our invention, and its mode of operation, what we claim as new is:

1. A system of the character described comprising, a pulse generator of the cavity resonator type, a pulse echo receiver having a voltage tunable local oscillator, a first automatic frequency control circuit for said oscillator comprising the cavity of said generator and means including a microwave discriminator translating the resonant frequency of said cavity into a tuning control voltage for said local oscillator, a second automatic frequency control circuit for said local oscillator comprising means including a mixer receiving a sample of the transmitted pulse and the output of said local oscillator for developing a tuning control voltage for said local oscillator, and switch means for switching said local oscillator from said first automatic frequency control circuit to said second automatic frequency control circuit when a pulse is transmitted.

2. A system as set forth in claim 1, wherein said first automatic frequency control circuit also includes a sweep signal generator for causing said local oscillator to sweep the total pulse generator tuning range, and means responsive to the output of said discriminator for locking the sweep generator voltage.

3. A system as set forth in claim 2, together with memory means for said local oscillator, said memory means being common to said first and second automatic frequency control circuits, and means causing said memory means to hold the frequency of said local oscillator at substantially the voltage developed under control of said second automatic frequency control circuit during the initial portion of the interpulse period.

4. A system as set forth in claim 3, wherein said memory means comprises capacitor means, and sweep generator and first automatic frequency control circuit control means operable to connect the output of said memory means to the input of said memory means.

5. A system of the character described, comprising a pulse generator including a frequency determining tuned circuit, a pulse echo receiver having a voltage tunable local oscillator, a first automatic frequency control circuit for said oscillator comprising the tuned circuit of said generator and means including a pulse frequency discriminator translating the resonant frequency of said tuned circuit into a tuning control voltage for said local oscillator, a second automatic frequency control circuit for said local oscillator comprising means including a mixer receiving a sample of the transmitted pulse and the output of said local oscillator and including an intermediate frequency discriminator for developing a tuning control voltage for accurately tuning said local oscillator to develop in the mixer said intermediate frequency, and switch means for switching said local oscillator from said first automatic frequency control circuit to said second automatic frequency control circuit when a pulse is transmitted.

References Cited

UNITED STATES PATENTS

| | | | |
|---|---|---|---|
| 2,523,537 | 9/1950 | Mayer | 343—17.1 |
| 2,798,946 | 7/1957 | Howery et al. | 343—17.1 |
| 2,856,600 | 10/1958 | Clevenger | 343—17.1 |
| 2,461,144 | 2/1949 | Cook | 343—17 |
| 2,603,744 | 7/1952 | Larson | 343—18 |

RODNEY D. BENNETT, *Primary Examiner.*
FREDERICK M. STRADER, *Examiner.*
G. J. MOSSINGHOFF, J. P. MORRIS,
*Assistant Examiners.*